United States Patent [19]

Kalbassi et al.

[11] Patent Number: 5,656,065
[45] Date of Patent: Aug. 12, 1997

[54] MULTIBED PRESSURE SWING ADSORPTION APPARATUS AND METHOD FOR THE OPERATION THEREOF

[75] Inventors: Mohammed Ali Kalbassi, Surrey, England; Shyam Ramchand Suchdeo, Wescosville, Pa.

[73] Assignee: Air Products and Chemicals, Inc., Allentown, Pa.

[21] Appl. No.: 539,093

[22] Filed: Oct. 4, 1995

[51] Int. Cl.$^6$ .................................. B01D 53/047
[52] U.S. Cl. ..................... 95/96; 95/98; 95/105; 95/122; 95/139
[58] Field of Search ................. 95/96–105, 121, 95/122, 130, 139; 96/115, 130, 133, 144; 62/626, 643, 648

[56] References Cited

U.S. PATENT DOCUMENTS

| | | | |
|---|---|---|---|
| 3,176,444 | 4/1965 | Kiyonaga | 95/97 X |
| 3,430,418 | 3/1969 | Wagner | 95/100 |
| 3,564,816 | 2/1971 | Batta | 95/100 |
| 3,605,423 | 9/1971 | Stoklosinski | 62/643 |
| 3,636,679 | 1/1972 | Batta | 95/100 |
| 3,717,974 | 2/1973 | Batta | 95/98 |
| 3,738,087 | 6/1973 | McCombs | 95/98 |
| 4,077,780 | 3/1978 | Doshi | 95/100 |
| 4,160,651 | 7/1979 | Pivard | 95/97 |
| 4,280,824 | 7/1981 | Lassmann et al. | 95/97 |
| 4,315,759 | 2/1982 | Benkmann | 95/98 X |
| 4,326,858 | 4/1982 | Benkmann | 95/98 |
| 4,371,380 | 2/1983 | Benkmann | 95/97 |
| 4,402,712 | 9/1983 | Benkmann | 95/98 |
| 4,475,929 | 10/1984 | Fuderer | 95/97 |
| 4,529,412 | 7/1985 | Hayashi et al. | 95/96 |
| 4,650,500 | 3/1987 | Patel | 95/100 |
| 4,690,696 | 9/1987 | Sircar et al. | 95/97 |
| 4,711,645 | 12/1987 | Kumar | 55/26 |
| 4,761,165 | 8/1988 | Stöcker et al. | 95/98 X |
| 4,834,780 | 5/1989 | Benkmann | 95/98 |
| 4,857,083 | 8/1989 | DiMartino | 95/103 X |
| 4,981,499 | 1/1991 | Hay et al. | 55/26 |
| 5,015,272 | 5/1991 | Okada et al. | 95/100 X |
| 5,202,096 | 4/1993 | Jain | 62/626 X |
| 5,246,676 | 9/1993 | Hay | 423/219 |
| 5,250,088 | 10/1993 | Yamaguchi et al. | 95/98 |
| 5,560,763 | 10/1996 | Kumar | 95/98 |

FOREIGN PATENT DOCUMENTS

| | | |
|---|---|---|
| 0173422 | 6/1985 | European Pat. Off. ......... B01D 53/04 |
| 0254567 | 7/1987 | European Pat. Off. ......... B01D 53/04 |
| 453202 | 4/1991 | European Pat. Off. . |
| 0451677 | 4/1991 | European Pat. Off. ......... C01B 21/04 |
| 3702190 | 1/1987 | Germany . |
| 55-27034 | 2/1980 | Japan . |
| 63-107720 | 10/1986 | Japan . |

OTHER PUBLICATIONS

Skarstrom, C.W. "Heatless Fractionation of Gases over Solid Adsorbents", vol. II, 95, N.W. Li (ED) C.R.C. Press, Cleveland, Ohio 1972.

*Primary Examiner*—Robert Spitzer
*Attorney, Agent, or Firm*—Geoffrey L. Chase

[57] ABSTRACT

Pressure swing apparatus comprises at least three parallel beds of adsorbent operated on cycles of being on-line to adsorb contaminant from a feed gas stream under pressure, being depressurized, being regenerated by a purge gas, and being repressurised. Feed gas is transferred from a depressurising bed to a repressurizing bed to reduce switch loss and repressurization is extended to occupy at least 50% of the cycle to smooth the feed gas output.

3 Claims, 2 Drawing Sheets

Fig. 1 (Prior Art)

| BED 1 | On-Line | D | Purge | Rep |
| BED 2 | D | Purge | Rep | On-Line |

Fig. 3

| BED 1 | Feed | E | D | Purge | E | Rep |
| BED 2 | E | D | Purge | E | Rep | Feed |
| BED 3 | E | Rep | Feed | E | D | Purge |

Fig. 4

| BED 1 | Feed | E | D | Purge | E | Rep |
| BED 2 | Feed | E | D | Purge | E | Rep | Feed |
| BED 3 | E | D | Purge | E | Rep | Feed |
| BED 4 | E | Rep | Feed | E | D | Purge |

Fig. 5

| BED 1 | Feed | E | D | Purge | E | Rep |
| BED 2 | Feed | E | D | Purge | E | Rep | Feed |
| BED 3 | E | D | Purge | E | Rep | Feed |
| BED 4 | Purge | E | Rep | Feed | E | D |
| BED 5 | E | Rep | Feed | E | D | Purge |

| | | | | | | | | | |
|---|---|---|---|---|---|---|---|---|---|
| BED 1 | | Feed | E D | | Purge | | | E | Rep |
| BED 2 | Feed | E D | | Purge | | | E | Rep | Feed |
| BED 3 | E D | | Purge | | E | Rep | | Feed | |
| BED 4 | | Purge | | E | Rep | | Feed | | E D Purge |
| BED 5 | Purge | E | Rep | | Feed | | E D | | Purge |
| BED 6 | E | Rep | | Feed | | E D | | Purge | |

MULTIBED PRESSURE SWING ADSORPTION APPARATUS AND METHOD FOR THE OPERATION THEREOF

TECHNICAL FIELD OF THE INVENTION

The present invention relates to pressure swing adsorption apparatus and methods of conducting pressure swing adsorption. In particular, the invention relates to the use of at least three beds of adsorbent in parallel in pressure swing adsorption apparatus so as to minimise variations in the rate of product flow from such apparatus and/or to reduce switch loss.

Pressure swing adsorption (PSA) has recently come into widespread use as a technique for removing one or more undesired gas components from a gas mixture. It is widely used to clean the feed air to a cryogenic air separation plant from atmospheric contaminants including water and carbon dioxide. In a PSA system, the gas to be purified is fed through a bed of solid adsorbent which is periodically regenerated to remove from it the contaminating component or components which it has extracted from the gas stream. Usually, two adsorbent beds are arranged in parallel and used with one bed being on-line whilst the other is being regenerated. Each undergoes a cycle of phases in which the bed is first on-line to adsorb a component from the gas stream, is then depressurised, is then regenerated and is then repressurised before being placed back on line.

DESCRIPTION OF PRIOR ART

U.S. Pat. No. 4,711,645 and DE-A-3702190 disclose the use of a dual bed adsorbent PSA system. That is to say, in each of the two parallel branches of the PSA system there are two different adsorbents in series. The adsorbent systems described are activated alumina and molecular sieve in the air feed and product end of the bed respectively. Water is adsorbed on the activated alumina section and carbon dioxide and hydrocarbons on the molecular sieve. Short cycle times ensure that most of the heat of adsorption is stored in the bed during the on-line stream period to assist in regeneration during the subsequent desorption step.

Japanese Patent Specification 63107720, EP-A-453202 and Skarstrom, C. W. "Heatless Fractionation of Gases Over Solid Adsorbents" Volume II, 95, N.N.Li (Ed), CRC Press, Cleveland, Ohio 1972, all disclose the use of an activated alumina two bed PSA system to remove water and carbon dioxide from air to the limits expected in the front end of an air separation unit. The first two of these references state that in order to remove hydrocarbons, a layer of 13× mole sieve is required. The benefits of a high percentage of alumina in a PSA adsorbent is that unlike 13× mole sieve, alumina has very little adsorption capacity for air. As a result, in a fast switching environment, far less bed temperature fluctuation is experienced. Bed temperature fluctuation can adversely affect the PSA capacity and product air temperature steadiness.

During depressurisation, feed gas which has passed into the adsorbent bed and has been purified is released and is wasted. The amount of gas lost in this way is known as the switch loss.

Japanese Specification 55-27034 discloses a $CO_2$ adsorption system in which three absorbent columns operate in parallel. At any one time two operate in PSA mode whilst the other is thermally regenerated. After thermal regeneration, the third column is switched to on-stream adsorption to substitute for one of the other two. This is basically a two parallel bed PSA system with provision for periodic thermal regeneration because of the known effect of the gradual accumulation of water in a dual bed system.

BRIEF DESCRIPTION OF THE INVENTION

None of the references discussed above remark on the fact that when a short cycle two bed PSA system is used, during the short repressurisation step, a portion of the product air to the plant is consumed in repressurising the bed such that this results in a dip in the air flow from the PSA purification system to the cryogenic distillation and causes a severe dynamic disturbance of the distillation process. During depressurisation of an adsorbent vessel and prior to the purge step, valuable compressed air is vented to the atmosphere to enable the low pressure purge gas, normally nitrogen rich waste gas from the cryogenic plant, to pass through the bed during the regeneration phase. As indicated above, the loss of compressed air in this way constitutes switch loss from the PSA system. Variations in the output of purified gas from a PSA system in this way and unnecessarily high switch loss will be similarly disadvantageous in many other contexts where the feed gas to the PSA system is not necessarily air and the product gas is used in processes other than cryogenic air separation.

The present invention addresses the problem of minimising the adverse impact of known two bed PSA switching patterns upon the continuity of product flow from the PSA system and the consequent effect upon the stability of downstream processes such as air separation units which this entails. Separately, it also addresses the desirability of minimising switch losses.

In a first aspect, the invention provides pressure swing adsorption apparatus for conducting pressure swing adsorption of a gas component from a gas stream said apparatus comprising at least three parallel beds of adsorbent and means for regulating gas flow through said beds such that each bed undergoes repeated cycles of operation in which for respective periods it is on-line, is depressurised, is regenerated, and is repressurised, with the cycles of the beds being phased with respect to one another such that over a cycle of operation there is a bed undergoing repressurisation at least 50% of the time, more preferably at least 80% and most preferably at least 90% of the time.

Preferably for each bed the repressurisation occupies a period of time which is at least 40% of the length of the on-line period in each cycle.

It is preferred that the repressurisation period is at least 75% as long as the on-line period, more preferably at least 90% as long as the on-line period.

In a second aspect, the invention provides pressure swing adsorption apparatus for conducting pressure swing adsorption of a gas component from a gas stream, said apparatus comprising at least three parallel beds of adsorbent and means for regulating gas flow through said beds such that each bed undergoes repeated cycles of operation in which for respective periods it is on-line, is depressurised, is regenerated, and is repressurised, with the cycles of the beds being phased with respect to one another such that during at least part of the period one bed is on-line another is being regenerated and a third is being repressurised, such that for each bed the repressurisation occupies a period of time which is at least 40% of the length of the on-line period in each cycle.

Preferably, apparatus according to the first aspect of the invention also operates in accordance with the second aspect.

Preferably, during part of the period for which one bed is on-line another is being depressurised and a third is being repressurised, and during each cycle gas is fed from the bed being depressurised to the bed being repressurised.

Said means for regulating gas flow may comprise conduits for gas flow in or connecting said beds and connecting each said bed to a source of said gas and to an outlet from the apparatus for said gas purified by removal of said component, valve means in said conduits operable to open and close respective ones of said conduits, and valve control means programmed to operate said valve means in sequence to produce said cycles of operation.

Preferably, said valve means is programmed so as in each cycle to close connections between a bed to be depressurised and both the source of gas to be purified and the outlet for purified gas, to keep closed connections between a bed to be repressurised and both the source of gas to be purified and the outlet for purified gas, and to establish a connection between the bed to be depressurised and the bed to be repressurised to allow gas to flow from the bed to be depressurised to the bed to be repressurised. This is known as the equilibration step.

Preferably, the valve means is programmed to maintain said connection between the bed to be depressurised and the bed to be repressurised until the pressures in said beds are substantially equilibrated.

The beds may be considered to be substantially equilibrated in pressure when the pressure differential between the beds is no greater than 20% of the initial pressure differential. More preferably however equilibration is continued until the pressure differential is no more than 10% of the initial pressure differential.

The invention also provides a method for conducting pressure swing adsorption of a gas component from a gas stream comprising passing said gas through at least three parallel beds of adsorbent and regulating gas flow through said beds such that each bed undergoes repeated cycles of operation in which for respective periods it is on-line, is depressurised, is regenerated, and is repressurised, with the cycles of the beds being phased with respect to one another such that during at least part of the period one bed is on-line, another is being regenerated and a third is being repressurised such that for each bed the repressurisation occupies a period of time which is at 40% of the length of the on-line period in each cycle.

The invention further provides a method for conducting pressure swing adsorption of a gas component from a gas stream, comprising passing said gas through at least three parallel beds of adsorbent and regulating gas flow through said beds such that each bed undergoes repeated cycles of operation in which for respective periods it is on-line, is depressurised, is regenerated, and is repressurised, with the cycles of the beds being phased with respect to one another such that over a cycle of operation there is a bed undergoing repressurisation at least 50% of the time.

Preferably, according to either method, the cycles of the beds are phased with respect to one another such that during part of the period for which one bed is on-line another is depressurised and another is repressurised and during each cycle gas is fed from the bed being depressurised to the bed being repressurised.

BRIEF DESCRIPTION OF THE DRAWINGS

FIG. 1 shows a typical cycle for the operation of a prior art two bed PSA system as described by Skarstrom, where On-Line=the adsorption step, D=the desorption step, Purge= the purge step, and Rep=the repressurization step;

FIG. 3 shows the cycle of operation of the apparatus of FIG. 2, where Feed=the adsorption step, E=the equalisation step, D=the desorption step, Purge=the purge step and Rep=the repressurization step;

FIG. 4 shows a cycle of operation for a modified version of the apparatus of FIG. 2 including four adsorbent beds using the same nomenclature;

FIG. 5 shows a cycle of operation possible using a modified version of the apparatus of FIG. 2 including five adsorbent beds using the same nomenclature.

DETAILED DESCRIPTION OF THE INVENTION

Figures 2, 6:
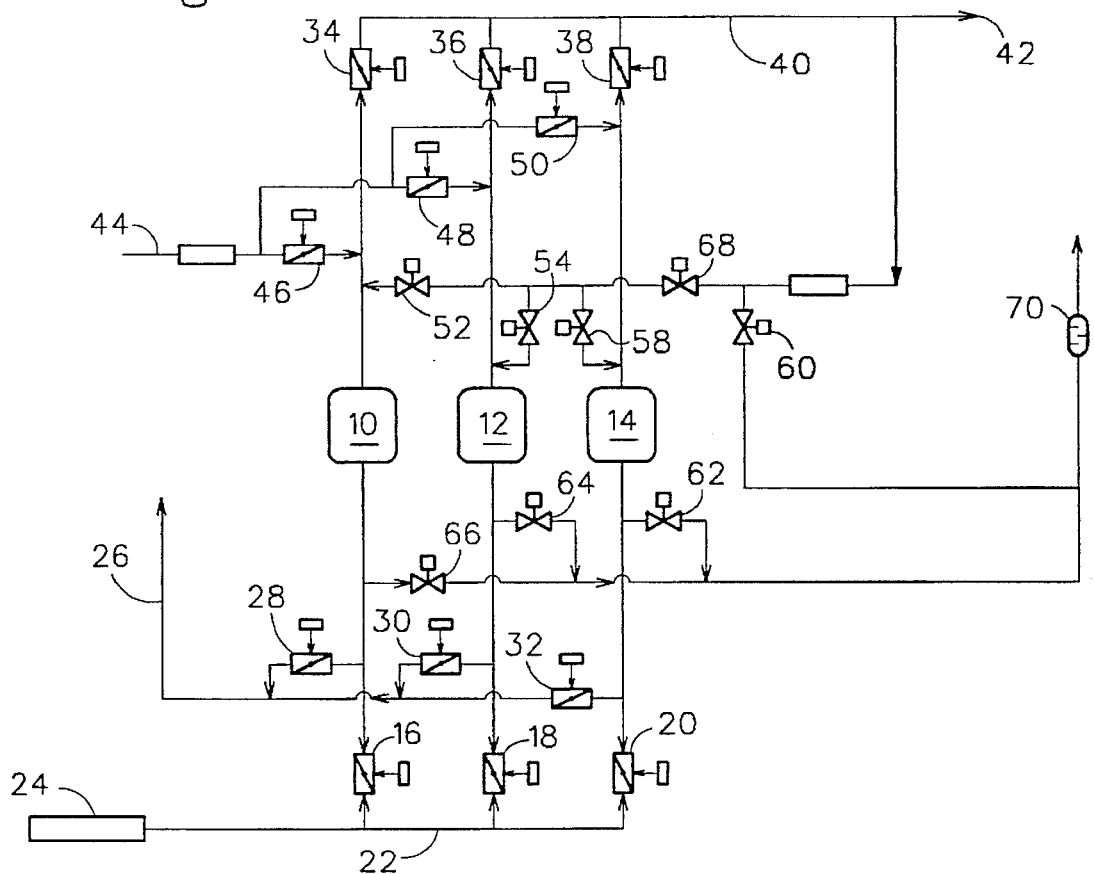
FIG. 2 is a schematic illustration of apparatus according to the invention.
FIG. 6 shows a cycle of operation possible using a modification of the apparatus of FIG. 2 having six adsorbent beds using the same nomenclature.

Preferred aspects of the invention will be described below with reference being made to the non-limiting examples which follow and the accompanying drawings.

It should be appreciated that each of the beds of adsorbent referred to above which are arranged in parallel may be divided into a number of layers of the same or different adsorbents arranged in series. The preferred adsorbent for use in connection with the invention is alumina. A number of different grades of alumina and different treated aluminas are known in the art for use in pressure swing adsorption processes. However, it is also within the scope of the invention to employ other adsorbents including molecular sieve or mixed beds of adsorbent, for instance beds having an alumina layer at the feed end and molecular sieve or silica gel layer at the product end. Mixed beds may of course be provided with each adsorbent being in a separate vessel with the vessels connected in series.

As shown in FIG. 1, typical prior art apparatus is operated according to a cycle in which a first bed of adsorbent is on-line, receiving input of feed gas, adsorbing at least one contaminating component from it and outputting the purified feed gas for subsequent use. The second bed, during the on-line or feed period of the first bed, is depressurised with the gas removed from the bed being wasted, and is then purged by a counter-current flow of a gas low in its content of the contaminant which has to be removed from the bed. Finally, during the on-line period of the first bed, the second bed is repressurised by a flow of gas from the outlet of the first bed. The second bed then goes on-line and the first bed undergoes the process of depressurisation, purging for regeneration and repressurisation. During the repressurisation of each bed, the diversion of flow from the outlet of the on-line bed to produce repressurisation causes substantial fluctuations in the flow of feed gas to the down-stream plant.

Apparatus for use in accordance with the present invention shown in FIG. 2 comprises three beds of adsorbent 10, 12 and 14 arranged in parallel. Each is connected via a respective inlet valve 16, 18, 20 to an inlet manifold 22 connected to a source 24 of feed gas. The inlet end of each of the beds 10, 12, 14 is also connected to a first venting manifold 26 via respective venting valves 28, 30, 32. The outlet from each of the beds 10, 12, 14 is connected via a respective outlet valve 34, 36, 38 to an outlet manifold 40 which is connected to downstream processing apparatus such as the cold box of an air separation unit 42. Waste nitrogen from the air separation unit is supplied to the apparatus of FIG. 2 at an input 44 and is connected to the outlet end of each bed 10, 12, 14 for counter-current purging flow via a respective inlet valve 46, 48, 50. The outlets of the beds 10, 12, 14 are interconnected amongst themselves via equilibration valves 52, 54 and 58. Lastly, both the inlet side and the outlet side of the beds 10, 12, 14 are connected via valves 60, 62, 64, 66 and 68 to a venting silencer 70. The operation of the control valves is controlled in a known manner by appropriate control means, not illustrated.

The phasing of the operations of the beds 10, 12, 14 is illustrated in FIG. 3 in which it can be seen that during the on-line or feed period (Feed) of each bed, another of the beds is first equilibrated (E), then depressurised (D) and then purged (Purge) for regeneration whilst the third bed undergoes the steps of equilibration and repressurisation (Rep). In the equilibration phase, a bed which is to be depressurised and purged is connected to a bed which has been depressurised and purged to allow gas to flow from the higher pressure bed to the lower pressure bed. This reduces the effective amount of gas required for repressurisation and has the additional effect of reducing switch loss as gas which in the scheme of FIG. 1 would be vented to waste is used to partially repressurise the third bed.

The other noteworthy feature of the cycle of operation shown in FIG. 3 is that the repressurisation phase of each bed is greatly extended in comparison with the scheme shown in FIG. 1. This is possible of course because of the presence of more than two beds and the benefit of this is that repressurisation is a more gradual and constant rate process which is going on almost all of the time during the operation of the apparatus, thus greatly reducing or eliminating the fluctuations in output. Indeed, it will be noted that during the whole of the on-line period for any one bed, one of the others is being repressurised or equilibrated and therefore over a cycle of operation there is a bed being repressurised at all times when equilibration is not going on. The repressurisation therefore extends over most of the cycle.

To achieve the cycle of operation shown in FIG. 3, the apparatus of FIG. 2 is operated by supplying inlet air saturated with water and containing ambient quantities of carbon dioxide such as 300 to 600 ppm and hydrocarbons into the PSA unit at the inlet 24. The stream may be flowed first through bed 10 via valve 16 with bed 10 being at a relatively high pressure.

As at the start of the on-line period of bed 10, bed 12 has just come off-line and is to be equilibrated with bed 14 which is at low pressure and has just been regenerated. Valves 16 and 34 are therefore open and all the others are presently closed. To equilibrate beds 12 and 14, valves 54 and 58 are opened. When the pressures are sufficiently equilibrated, valve 54 is closed and valve 64 is opened to depressurise bed 12 via silencer 70. At the same time valve 68 is opened, with valve 58 remaining open, so as to repressurise bed 14 with product gas at a constant and relatively slow rate.

Bed 12 is now regenerated by purging with dry, $CO_2$ free nitrogen by closing valve 64, and opening valves 48 and 30. When bed 12 is regenerated, bed 10 comes off-line with valves 16 and 34 closing. Regeneration of bed 12 is ended by closing valves 48 and 30 and beds 10 and 12 are equilibrated by opening valves 52 and 54. Repressurised bed 14 is put on-line by closing valve 58 and opening valves 20 and 38.

The cycles may be conducted endlessly with bed 10 being depressurised and regenerated as described for bed 12 followed by bed 14.

During periods of the cycle when no bed is being repressurised with product gas via valves 68 and one out of 52, 54 and 58, product gas may be vented via valve 60 or less preferably feed gas may be vented via one of valves 62, 64 and 66 to maintain a constant rate of output of purified gas by decreasing the rate of flow through the on-line bed. Alternatively, product gas could be vented at a suitable rate.

Optionally, the cycles may be phased so that there are overlaps between the on-line periods of the beds. During such overlap periods too, venting may be carried out to maintain a constant output of purified gas.

It will readily be appreciated that further beds may be included in parallel in a modified version of the apparatus shown in FIG. 2. The inclusion of further beds will allow the cycle of operations shown in FIGS. 3 to 6.

A constant feature of these various cycles of operation shown in the Figures is that two beds are equilibrated before one of them is depressurised and a second constant feature is that the repressurisation is always an extended and gradual operation. However as more beds are introduced, there can be more than one bed being repressurised during the course of the on-line or feed period of any given bed. Thus in FIG. 5, one sees that during the feed period of bed 1, beds 4 and 5 undergo repressurisation. During the course of a complete cycle for any one bed, at least one other bed is undergoing repressurisation throughout almost the whole of the cycle and during the remainder of the cycle, at least one bed is undergoing equilibration.

The effectiveness of the three bed system illustrated in FIG. 2 in smoothing air flow fluctuation to a subsequent cryogenic distillation system is shown by the following example.

EXAMPLE 1

The effectiveness of the three bed system shown in FIG. 2 in comparison with a conventional two bed system is assessed by considering the situation where air is fed at a pressure of 6 bara, purge flow as a function of air flow equals 0.45, the feed temperature is 33° centigrade, the feed $CO_2$ equals 400 ppm, the adsorbent is activated alumina, and the purge pressure equals 1.1 bara at 28° centigrade. The cycle sequences are as shown in FIGS. 1 and 3 respectively. The air flow is 2,000 $Nm^3/h$, purge flow equals 900 $m^3/h$. The bed volume for the two bed system is 0.2 $m^3$. The bed volume for the three bed system is 0.16 $m^3$ and it is assumed that 80% of the vessel volume is empty void. The table below shows the calculated effects on air flow variation from the output of the apparatus and on switch loss.

TABLE 1

|  |  | 2 Bed PSA | 3 Bed PSA |
| --- | --- | --- | --- |
| Depressurisation | s | 30 | 30 |
| Purge | s | 925 | 775 |
| equalisation | s | NA | 30 |
| repressurisation | s | 120 | 805 |
| parallel on line | s | 5 | 5 |
| on line | s | 1080 | 840 |
| Average Flow To Cold Box | Nm3/h | 1972 | 1988 |
| Max % Reduction in flow to Cold Box | % | 13 | 0.7 |
| Max % Reduction in flow to Cold Box (with venting) | % | 13 | Zero |
| Switch Loss | % | 1.4 | 0.7 |

In the comparison shown in Table 1, the cycle times have been optimised separately for the 2 bed and 3 bed PSA systems.

It will be observed that the variation in output flow to the cold box of a subsequent air separation unit can be reduced to zero by venting excess flow during any parallel on-line phase of the PSA operation and during equalisation so that air is taken from the on-line bed or beds at the same rate as during repressurisation as described above. Nonetheless, the switch loss is halved.

It will further be observed that repressurisation is conducted over a proportion of the cycle time given by 805/(805+30)%=96%, in contrast to the two bed system in which repressurisation occupies only 11% of the cycle.

Other possible cycle times for the operation of a three bed PSA system are shown in Table 2 below.

TABLE 2

|  |  | 2 bed min | 2 bed max | 3 bed min | 3 bed max |
|---|---|---|---|---|---|
| On Line | s | 300 | 1800 | 300 | 1800 |
| equal | s | 10 | 120 | 10 | 120 |
| repress | s | 60 | 480 | 290 | 1680 |
| purge | s | 205 | 1075 | 265 | 1550 |
| parallel | s | 5 | 5 | 5 | 5 |
| depress | s | 20 | 120 | 20 | 120 |

Whilst the invention has been described by reference to preferred embodiments thereof, many variations and modifications are possible within the scope of the invention.

We claim:

1. A method for conducting pressure swing adsorption of water and carbon dioxide gas components from a feed air gas stream to produce a constant output of purified feed air gas to a downstream cryogenic distillation, comprising passing said gas through at least three parallel beds of adsorbent and regulating gas flow through said beds such that each bed undergoes repeated cycles of operation in which for respective periods it is on-line, is pressure equalized, is depressurised, is regenerated, is pressure equalized and is repressurised, with the cycles of the beds being phased with respect to one another such that over a cycle of operation there is a bed undergoing repressurisation at least most of the cycle and when repressurisation is not being performed, purifed feed air gas is vented prior to the downstream cryogenic distillation, wherein the pressure swing adsorption method smoothes the fluctuation of the flow of purified feed air gas to the downstream cryogenic distillation system for air separation.

2. A method as claimed in claim 1, wherein there is abed undergoing repressurisation at least 80% of the time.

3. A method as claimed in claim 2, wherein there is a bed undergoing repressurisation at least 90% of the time.

* * * * *